United States Patent
Severwright

[11] Patent Number: 5,926,759
[45] Date of Patent: Jul. 20, 1999

[54] TELECOMMUNICATIONS SYSTEM

[75] Inventor: Robert Anthony Severwright, Hockley, United Kingdom

[73] Assignee: GEC—Marconi Limited, Middlesex, United Kingdom

[21] Appl. No.: 08/688,159

[22] Filed: Jul. 29, 1996

[30] Foreign Application Priority Data

Aug. 1, 1995 [GB] United Kingdom .................. 9515763

[51] Int. Cl.$^6$ .................................. H04Q 7/20
[52] U.S. Cl. .................. 455/431; 455/11.1; 455/525
[58] Field of Search .................... 455/33.1, 33.2, 455/33.4, 34.1, 34.2, 54.1, 56.1, 62, 67.1, 11.1, 63, 12.1, 98, 422, 427, 428, 431, 436, 524, 525; 379/58, 59

[56] References Cited

U.S. PATENT DOCUMENTS 5,123,112  6/1992  Choate .................................. 455/56.1
5,150,362  9/1992  Akerberg .

FOREIGN PATENT DOCUMENTS 2 275 391  8/1994  United Kingdom .
2 287 379  9/1995  United Kingdom .
WO94/14288  6/1994  WIPO .

*Primary Examiner*—Andrew Faile
*Assistant Examiner*—Christopher Onuaku
*Attorney, Agent, or Firm*—Spencer & Frank

[57] ABSTRACT

The invention provides a system and method whereby a mobile station of telecommunications system selects one of a number of fixed ground stations by which the mobile station communicates with the public switched telephone network or other such system, selection being made by the mobile station receiving selected criteria and deriving from a plurality of these criteria a score for each of a plurality of the fixed stations, the fixed station via which communication is to be made being selected in dependence upon the score derived for that fixed station.

36 Claims, 4 Drawing Sheets

Fig.6.

| CRITERION | | $k_q$ | $k_{cr}$ | $k_r$ | $k_{ss}$ | $k_{mr}$ | $k_{gst}$ | $k_s$ | $k_{sl}$ | $k_{s(m)}$ |
|---|---|---|---|---|---|---|---|---|---|---|
| EN ROUTE GS CONDITION | | | | | | | | | | |
| CALLS | WoW | .2 | 0 | 0 | 1 | 0 | .4 | .8 | 1 | 0 |
| | ALT | .5 | .3 | .2 | .15 | .8 | .6 | .8 | 1 | 0 |
| | ALT/DESC | .5 | .3 | .2 | .15 | .8 | .2 | .8 | 1 | 0 |
| | NO ALT | .5 | .3 | .2 | .15 | .8 | 1 | .8 | 1 | 0 |
| NO CALLS | WoW | .2 | 0 | 0 | 1 | 0 | .4 | 1 | 1 | .8 |
| | ALT | .5 | .3 | .1 | .15 | .8 | 1 | 1 | 1 | .8 |
| | NO ALT | .5 | .3 | .1 | .15 | .8 | 1 | 1 | 1 | .8 |
| INTERMEDIATE GS CONDITION | | | | | | | | | | |
| CALLS | WoW | .2 | 0 | 0 | 1 | 0 | .6 | .6 | 1 | 0 |
| | ALT | .5 | .6 | .4 | 0 | 0 | .6 | .6 | 1 | 0 |
| | ALT/DESC | .5 | .6 | .4 | 0 | 0 | .8 | .7 | 1 | 0 |
| | NO ALT | .5 | .6 | .4 | 0 | 0 | .3 | .6 | 1 | 0 |
| NO CALLS | WoW | .2 | 0 | 0 | 1 | 0 | .6 | 1 | 1 | .8 |
| | ALT | .5 | .6 | .4 | 0 | 0 | .6 | 1 | 1 | .8 |
| | NO ALT | .5 | .6 | .4 | 0 | 0 | .6 | 1 | 1 | .8 |
| AIRPORT GS CONDITION | | | | | | | | | | |
| CALLS | WoW | .2 | 0 | 0 | 1 | 0 | .8 | .7 | 1 | 0 |
| | ALT | 0 | 0 | 0 | 0 | 0 | 0 | .7 | 1 | 0 |
| | NO ALT | 0 | 0 | 0 | 0 | 0 | 0 | .7 | 1 | 0 |
| NO CALLS | WoW | .2 | 0 | 0 | 1 | 0 | .8 | .9 | 1 | .8 |
| | ALT | .5 | .5 | .5 | 0 | 0 | .4 | .9 | 1 | .8 |
| | NO ALT | .5 | .5 | .5 | 0 | 0 | .4 | .9 | 1 | .8 |

TELECOMMUNICATIONS SYSTEM

The present invention relates to a telecommunications system, in particular a terrestrial flight telecommunications system, and method of operating same.

BACKGROUND OF THE INVENTION

In a telecommunications system, transmission to or from one or more mobile stations is achieved by means of a number of fixed stations each defining a cell, the cell being the area in which communication via the associated ground station can be effected.

In a mobile telecommunications system the mobile station, for example a mobile phone, normally comprises a logic circuitry which enables a fixed station to be selected and in a mobile phone application, for example, this selection could be made on the basis of signal strength.

The present invention is primarily concerned with a terrestrial flight telephone system, which systems are presently being deployed on commercial aircraft to enable telephone calls to be made on board the aircraft both whilst the aircraft is on the airport apron, and also whilst in flight. A detailed description of such a system is to be found in the European Telecommunications Standard Institute (ETSI) draft publication entitled: "Radio Equipment and Systems (RES) Terrestrial Flight Telephone System (TFTS) Part 2: Search Services, Radio Interface", dated July 1993 and subsequently updated and published as prETS300 326-2, the contents of which are hereby incorporated by way of reference. The ETSI document proposes a system in which a mobile air station selects a fixed ground station by a method summarised by the flow charts on pages 75–86 of that document. The method comprises establishing certain criteria relating to the mobile station, more particularly the aircraft on which it is located, and a number of fixed ground stations, and depending on those criteria an appropriate ground station is identified and a transmission effected via that ground station. This selection would for example be based on the closing rate alone to any ground station which had an acceptable signal strength.

SUMMARY OF THE INVENTION

According to the present invention there is provided a telecommunications system comprising at least one mobile station and a plurality of fixed stations with which the at least one mobile station can communicate, the at least one mobile station comprising processing means for receiving selected criteria, deriving from a plurality of these criteria a score for each of a plurality of fixed stations with which the at least one mobile station is able to communicate, and selecting on the basis of these scores the fixed station via which a transmission is to be routed.

By employing the present invention, deriving a score for each of a plurality of fixed stations and deciding on the basis of that score via which fixed station a transmission is to be routed, a more appropriate selection of fixed station can be obtained than with previous methods. By the previous methods a suitable cell would have been selected, whereas the present invention enables the most appropriate cell to be selected, and can thereby lead to an improved performance, for example by a reduction in the number of handovers required during a call.

Preferably the score for a particular fixed station is derived from an algorithm into which the selected criteria are input, such algorithm enabling a number of criteria to be taken into account and weighted appropriately. Certain criteria may be weighted in dependence on other criteria.

Preferably the processing means comprises means for receiving signals relating to the status of the mobile station and/or a fixed station for which it is determining a score, at least one criterion being multiplied by a constant associated with that criterion, the value of the constant being selected from one of a number of values depending on the status of the mobile and/or fixed station. This enables the selection process to take into account the status of the mobile station or fixed station. For example if the mobile station is an aircraft then the selection process may need to be biased towards a particular type of fixed ground station in dependence on whether the aircraft is on the ground or airborne.

Advantageously the system comprises a plurality of classes of fixed station and the processing means has means for identifying the class to which a particular fixed station belongs, and inserting a value in the algorithm in dependence upon the class of the fixed station for which a score is to be derived. This enables different weighting to be given to different base stations, for example a base station normally subject to high traffic density may be given a lower rating than one subject to low traffic density. The mobile station will then be biased towards selecting the fixed station with lower traffic density.

The fixed stations may be categorised as macro, micro or pico stations, as is conventional, with the algorithm being biased such that macro stations are favoured in preference to micro stations, which are in turn favoured in preference to pico stations. This prevents "passing" mobiles using micro or pico stations which are normally positioned so as to cope with high intensity local traffic.

Preferably a transmission is rerouted if the score of an alternative fixed station exceeds that of the present fixed station by a predetermined value or ratio. This provides hysteresis and prevents a mobile station "skipping" from cell to cell.

Advantageously some of the constants in the algorithm are selected in dependence on the class of fixed station, thereby enabling a different weighting to be applied to some of the criteria depending on the type of fixed station.

According to a second aspect of the present invention there is provided a terrestrial flight telephone system (TFTS), comprising a cellular communications system in accordance with the invention as described above, wherein the at least one mobile station is an air station for location aboard an aircraft and the plurality of fixed stations are ground stations. Such a system may comprise a number of ground stations categorised as airport ground stations, intermediate ground stations and en-route ground stations.

An airport ground station is herein defined as a ground station which is designed to serve air stations located in aircraft on the ground at the airfield. Such an airport ground station corresponds to a conventional pico station having a very high intensity of traffic but having relatively small cell size.

An intermediate ground station is herein defined as a ground station located such as to serve aircraft ascending from or descending to an airport, and would normally be located in close proximity to that airport. Such a ground station would correspond to a conventional micro station, serving a medium sized area of relatively dense traffic.

An en-route ground station is herein defined as one designed to serve a large area of fairly low intensity traffic, and a number of these would be located at strategic points such that they ideally together provide blanket coverage at least of the major flight paths. Such en-route stations would correspond to macro stations in a conventional system.

The bias introduced into the algorithm can be used to ensure that an en-route aircraft normally continues to use en-route stations even though it may be in an intermediate or airport cell, thus avoiding congestion of the intermediate or airport cell.

Preferably the processor receives some of the following criteria: closing rate to a ground station; quality of signal from a ground station; signal strength from a ground station; the cell limit of a ground station; the range to a ground station; whether the aircraft with which the processing means is associated is on the ground (weight on wheels); whether a ground station can be legally accessed. One preferred algorithm for deriving a score $[S]_{gs}$ for a ground station is $$[S]_{gs}=(k_{cr} \times C_{cr}+k_r \times C_r+k_{ss} \times C_{xx}+k_{mr} \times C_{mr})k_q \times C_q \times k_{sl}/k_{ho},$$

where the terms are as defined hereafter in the Detailed Description section of this document.

According to a third aspect of the invention there is provided a method of selecting, in a cellular telecommunications system, via which of a plurality of fixed stations a transmission with a mobile station is to be routed, the method comprising, for each fixed station with which the mobile station can communicate, receiving selected criteria and deriving from a plurality of these a score for each fixed station, and deciding on the basis of the scores through which fixed station the transmission is to be routed.

One embodiment of the present invention will now be described by way of example only with reference to the accompanying drawings, of which:

BRIEF DESCRIPTION OF THE DRAWINGS

FIG. 6 is an example of a table showing an assignment of values for constants suitable for various conditions.

DETAILED DESCRIPTION

Figure 1:
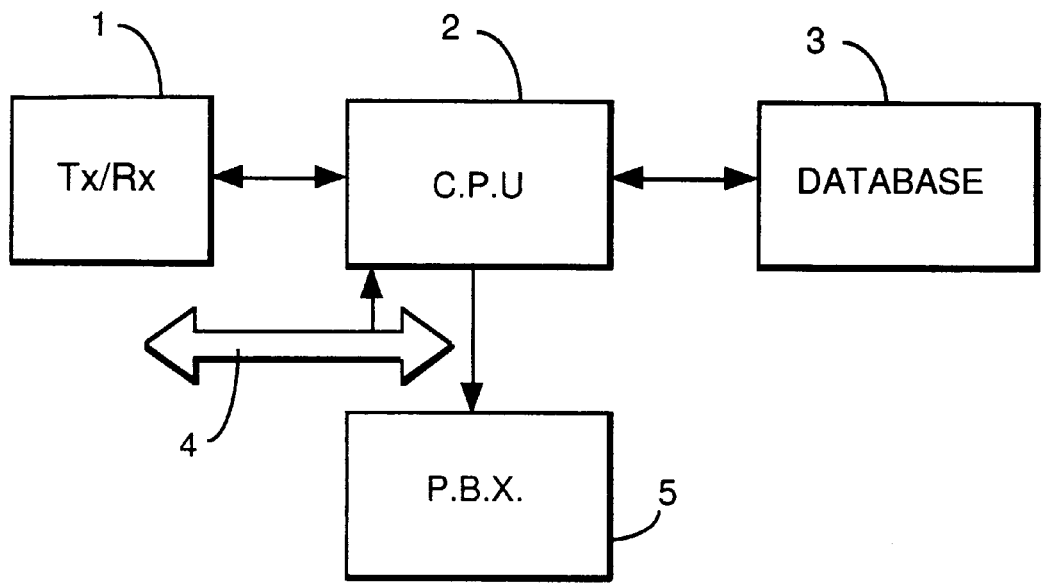
FIG. 1 schematically illustrates the components of a mobile station in accordance with the present invention.

Referring to FIG. 1 there is illustrated the primary components of the airborne mobile station. This comprises a transmitter/receiver 1 for communicating with a fixed ground station, a central processor unit (CPU) 2 which controls transmissions to and from receiver 1, and a data base 3 in which the CPU can store selected information. The CPU 2 is also connected to the aircraft data bus 4, through which it can obtain information relating to the status of the aircraft, and also to a private branch exchange (PBX) 5. The PBX 5 is in turn connected to telephones aboard the aircraft and enables telephones aboard the aircraft to be interconnected, or connected to the ground telephone system via the CPU 2, transmitter/receiver 1 and ground station of FIG. 2.

Figure 2:
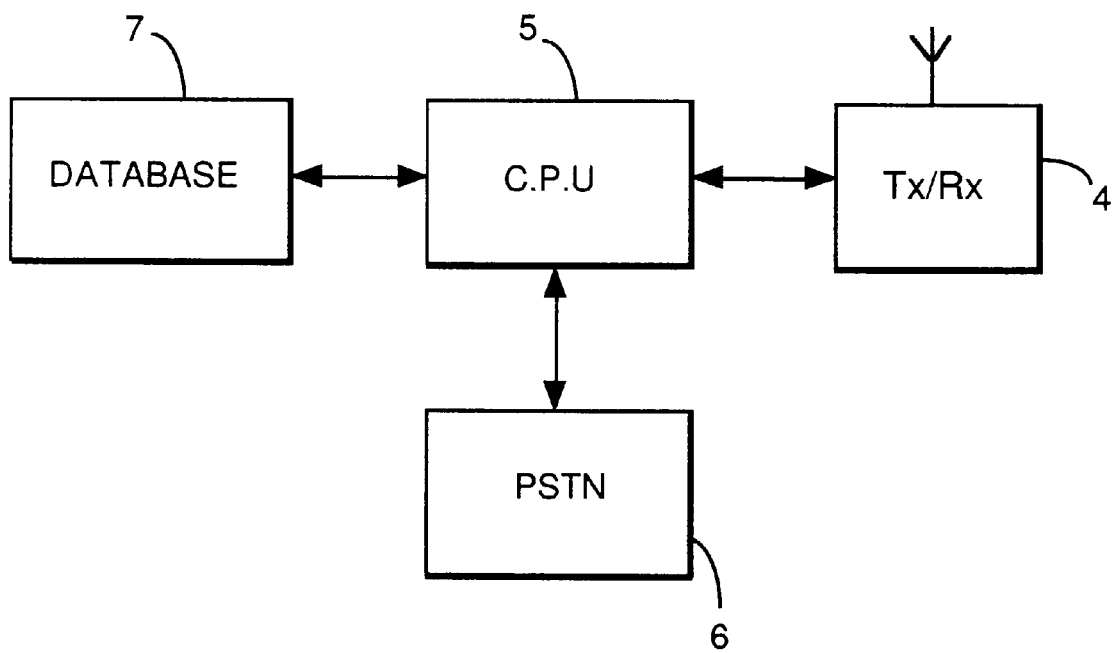
FIG. 2 schematically illustrates the components of a ground station in accordance with the present invention.

Referring to FIG. 2 the ground station comprises a transmitter/receiver 6 connected to a CPU 7 through which calls are routed to and from public switch telephone network (PSTN) 8. A data base 9 is also connected to the CPU which provides data to be transmitted via transmitter/receiver 6.

Figure 3:
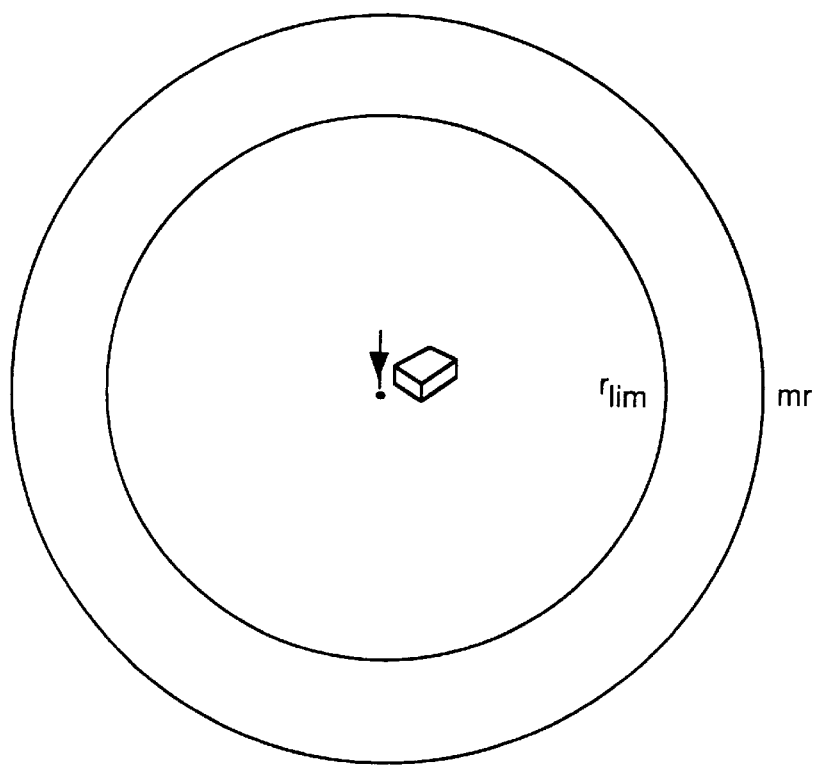
FIG. 3 schematically illustrates two of the ground station criteria utilised by the specific embodiment described herein.

The data base 9 of the ground station contains information relating to the ground station with which it is associated and also a number of adjacent ground stations. This information is transmitted in the access channel or broadcast control data channel BCCH(D) of the ground station. The information relating to the particular ground station from which the transmission is made includes maximum range (mr) of the ground station i.e. the radius of the cell associated with the ground station, the type of ground station, a synchronisation signal and a value ($r_{LIM}$), see FIG. 3. The air station of FIG. 1 is arranged, as will be described below, such that the range between mr and $r_{LIM}$ is a handover region, and therefore if a ground station is particularly busy by reducing $r_{LIM}$ it effectively reduces its working cell size as is illustrated in FIG. 3.

As mentioned above the BCCH(D) signal from a ground station also identifies the type of ground station. A terrestrial flight telephone system in accordance with the present embodiment comprises three types of ground stations providing different types of coverage as will now be explained with reference to FIG. 4.

Figure 4:
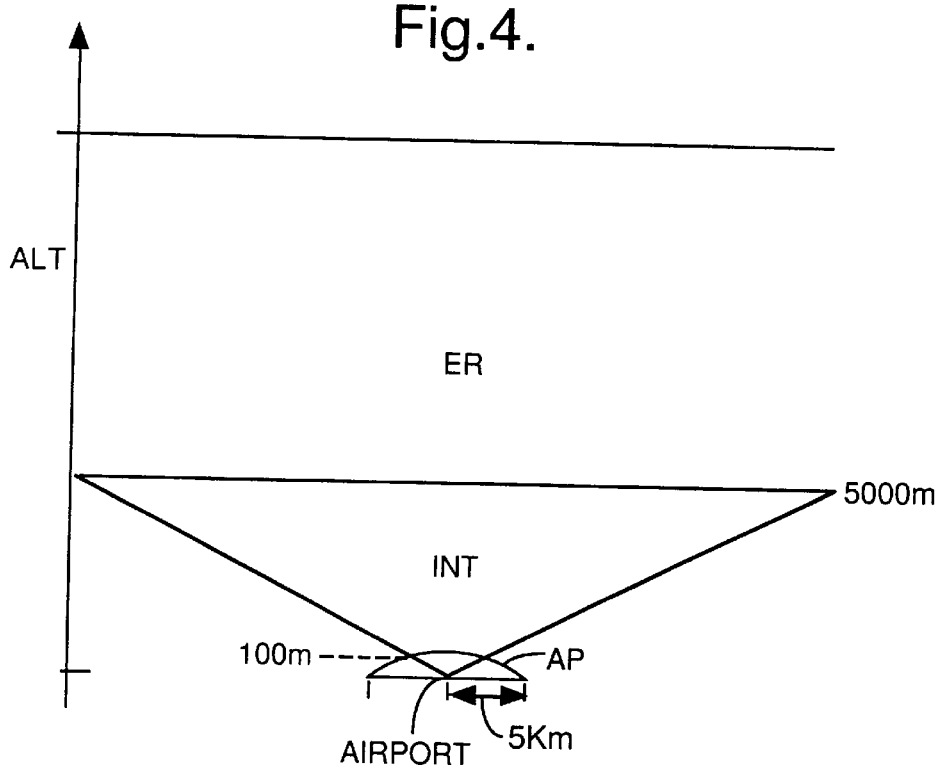
FIG. 4 schematically illustrates the inter-relationship between different classes of ground station in a terrestrial communications system in accordance with the present invention.

Referring to FIG. 4 a first ground station, an airport ground station (AP), is located at or adjacent an airport and has a horizontal range of approximately five kilometers. The purpose of this ground station is to serve aircraft which are located on the ground, which is detected by aircraft sensors indicating that the weight is on the wheels (WoW) of the aircraft. The airport cell extends vertically to approximately 100 meters to permit handover when an aircraft takes off. Such an airport cell is subject to very high traffic density having a large number of aircraft within a very small area, but the size of the cell does not need to extend greatly beyond the boundary of the airfield. A small airport cell has the advantage that another such cell can be located within 50 kilometers and operate on the same frequency band.

A second type of ground station is termed an intermediate (INT) ground station which serves a region shaped like an inverted cone above the airport, extending vertically to 5000 meters, with an inverted base of 100 kilometers radius. This ground station serves aircraft approaching or departing from the associated airport and is subject to fairly dense traffic but is of a relatively limited area.

A third type of ground station is an en-route ground station (E-R). Such stations are not associated with particular airports but provide blanket coverage at least along the major flight paths. The cells extend vertically to include the cruising altitude of most commercial airlines.

Figure 5:
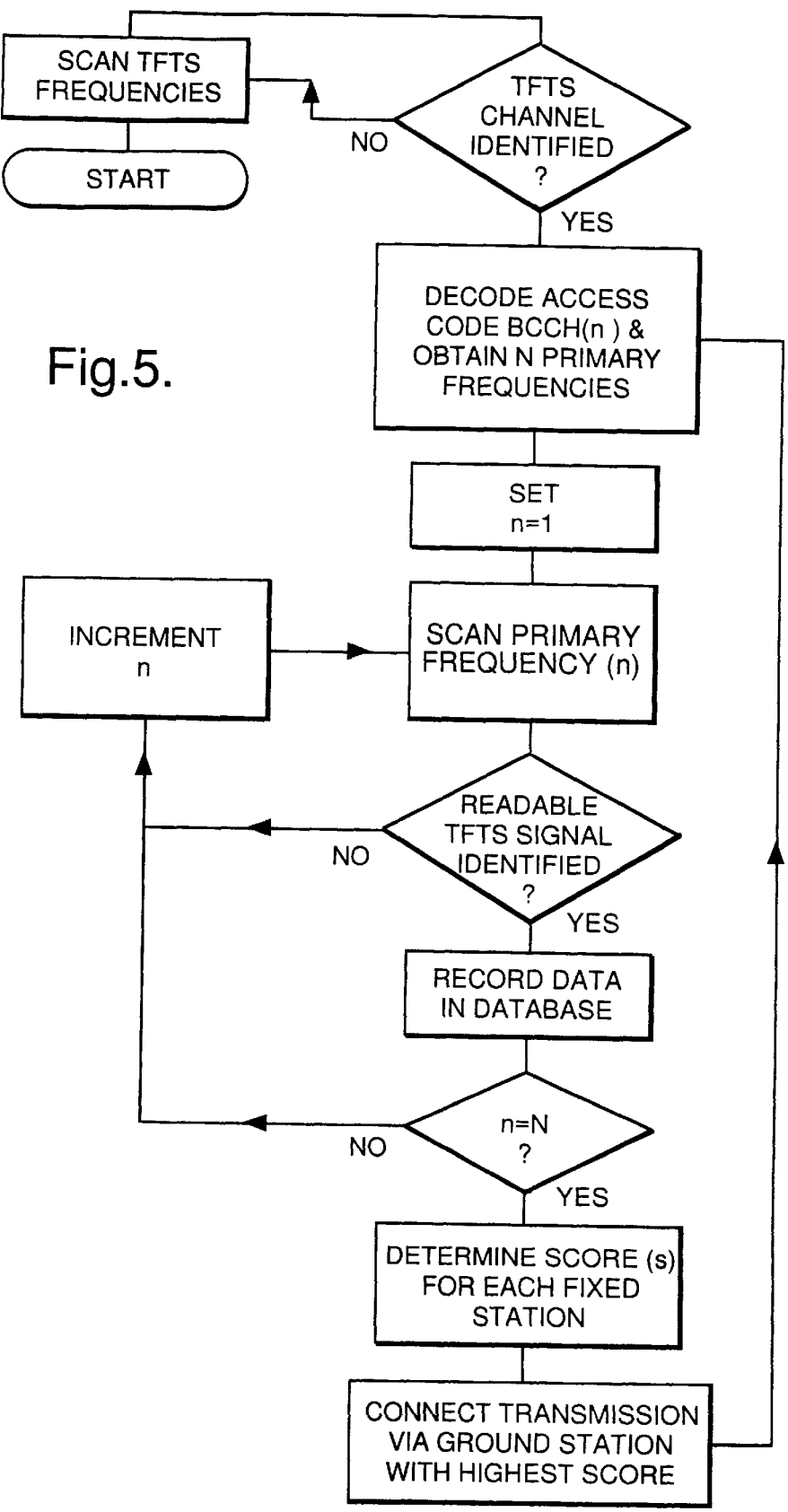
FIG. 5 is a flow chart illustrating the process by which the mobile station of FIG. 1 selects an appropriate ground station.

Referring to the flow chart of FIG. 5, in use the airborne station of FIG. 1 first scans a range of primary terrestrial flight telephone system (TFTS) frequencies allocated to the ground stations. This process continues until a TFTS signal is identified. Once such a signal is identified an access code contained within that signal is decoded. From the access code a broadcast control data channel BCCH(D) is identified and tuned to which contains information relating to the ground station with which it is associated and also the primary frequencies of adjacent ground stations. The CPU 2 of FIG. 1 stores in data base 3 the received information and then sequentially interrogates in turn the primary frequency associated with each other cell identified. For each primary frequency for which a readable signal is obtained the data conveyed by that signal for its associated ground station is also stored in the data base 3 of the airborne station. When this step has been repeated for each primary ground station identified by the first ground station, the CPU 2 derives a score for each of the ground stations using data in the data base received from the ground stations and also information received via the aircraft data bus 4 relating to the status of the aircraft. The way in which the score is derived is described below. The CPU then tunes the transmitter/receiver 1 to the frequency of the ground station with the highest score in order to connect a user of the private branch exchange 5 to the public switch telephone network 6 of FIG. 2. The process is then repeated for primary frequencies surrounding the selected ground station identified by the selected ground station.

The cell selection is made by deducing a score for each ground station in accordance with equation $$[S]_{gs} = (k_{cr} \times C_{cr} + k_r \times C_r + k_{ss} \times C_{ss} + k_{mr} \times C_{mr}) k_q \times C_q \times k_{sl}/k_{ho},$$

where the constants $k_?$ are derived from the table shown in FIG. 6. From the Table it is seen that the value of the constants depends on the type of ground station (En Route, Intermediate or Airport), whether a call is in process (CALLS) or not (NO CALLS), whether the weight is on the wheels of the aircraft (WoW), whether the aircraft is descending at less than 100 feet per minute, climbing, cruising at a constant altitude (ALT), or descending at a rate greater than 100 feet per minute (ALT/DESC).

With regard to the other terms of the equation, $C_{cr}$ is calculated by the relationship:
If cr<0 then $C_{cr}=40+cr \times 0.1852/3$
else $C_{cr}=40+cr \times 0.1852$ cr being the closing rate determined by the time delay between transmission and receipt of a signal, the ground station and air station both being synchronised to network time, as is standard practice. The negative closing rate is applied so that a ground station in which an aircraft is travelling away from the transmitter will be disadvantaged. $k_r$ is selected to apply the desired weighting to the criterion. $k_{cr}$ and $k_r$ operate in conjunction and provide a combined criterion where in the case of an en-route ground station, constant $k_{cr}$ is more powerful but does not dominate totally, and in the case of an intermediate ground station, the reverse applies and the $k_r$ term is more powerful. This normalises the parameters multiplied by the criteria to give all the terms a balanced effect. This means that INT, AP and ER ground stations can compete on equal terms for traffic.

$C_r$ is calculated as follows: $C_r=100-R/4$ where R, the range of the plane to the ground station, is in km. This gives $C_r$ a normal range of 0 to 100 where maximum range is represented by 0. As indicated above, $k_r$ operates in conjunction with $k_{cr}$ and against $k_{ss}$ and $k_q$.

$C_{ss}$ is calculated as follows: $C_{ss}=(ss+130)/0.8$ where ss, signal strength, at the aircraft receiver is in dBm. As indicated above, $k_{ss}$ operates in conjunction with $k_q$ and against $k_{cr}$ and $k_r$.

$C_{mr}$ is calculated as follows: $C_{mr}=100-mr/4$ where mr is the maximum range of the cell in km as described with reference to FIG. 3. $k_{mr}$ is set to give precedence to ground stations with smaller cell radii. This avoids loading the large cells excessively which would otherwise naturally occur because the large cell would be entered first.

$C_q$ is calculated as follows: Q<2, $C_q=0$, else $C_q=Q$, where Q is a quality factor derived from the constellation dispersions at the sampling times within the demodulator of the receiver. $k_q$ is selected to apply the desired weighting to the criterion. $k_q$ operates in conjunction with $k_{ss}$ and against $k_{cr}$ and $k_r$. Q is a multiplier term whilst the others are additive.

$k_{gst}$ allows preference to be given to one type of ground station relative to another. The preference is dependent on WoW, whether the weight is on the wheels (WoW) of the aircraft.

$k_{sl}$ makes allowance for whether the ground station can be legally accessed. This means that the air station conforms to the rules dictating whether it can use a given ground station, i.e. it is within the cell boundary (mr). The criterion is a multiplication on the equation and so has a more powerful effect than the others. Two values are shown in the table: one for legal ($k_{sl}$); the other for not legal ($k_{sl(not)}$). A high value is assigned if the aircraft conforms to the rules, and a low value is assigned otherwise. This only applies for actual call establishment. It is not important for selecting the reference cell for BCCH(D) collection.

$k_{ho}=1$ if the range $R>r_{LIM}$, as described with reference to FIG. 3, thus encouraging handover in the handover region defined by the ground station.

Network time is normally available from a clock of the air station which is regularly synchronised to the true network time. However in the event that network time is not available, the following modifications are required:

1. Closing rate (cr) is set to zero.
2. $k_{sl}=0.8$ for all ground stations.
3. All ground stations are assumed to be not in the handover region.

Once a score has been derived for each ground station then a new ground station is selected if $[S]_{gs} \times k_s$ is greater than the score for the current cell. $k_s$ provides hysteresis and is applied to all cells except for the current cell, preventing unnecessary handovers.

The above criteria are but one selected set of criteria on which a system in accordance with the present invention, could be implemented. Furthermore, the values given in the table shown in FIG. 6 are only an arbitrary selection, and many variations of the invention will be apparent to a person skilled in this art.

A complete detailed description of a terrestrial flight telecommunications system is outside the scope of the present specification. However the present invention can be used in conjunction with a system as described in detail in the ETSI document referred to earlier in this specification.

I claim:

1. A telecommunications system comprising at least one mobile station and a plurality of fixed stations with which the at least one mobile station can communicate, the at least one mobile station comprising processing means for receiving selected criteria, deriving from a plurality of those criteria a score for each of a plurality of fixed stations with which the at least one mobile station is able to communicate, and selecting on the basis of those scores the fixed station via which a transmission is to be routed, said score for each fixed station being derived from an algorithm into which the selected criteria are input, the processing means comprising means for receiving signals relating to the status of the mobile station and/or a fixed station for which it is determining a score, wherein said at least one criterion is multiplied by a constant associated with that criterion, the value of the constant being selected from one of a number of values depending on the status of the mobile and/or fixed station.

2. A telecommunications system comprising at least one mobile station and a plurality of fixed stations with which the at least one mobile station can communicate, the at least one mobile station comprising processing means for receiving selected criteria, deriving from a plurality of those criteria a score for each of a plurality of fixed stations with which the at least one mobile station is able to communicate, and selecting on the basis of those scores the fixed station via which a transmission is to be routed, said score for each fixed station being derived from an algorithm into which said selected criteria are input, the system comprising a plurality of classes of fixed station, wherein the processing means has means for identifying the class to which a particular fixed station belongs and inserting a value in the algorithm in dependence upon the class of the fixed station for which a score is to be derived.

3. A system as claimed in claim 1 comprising a plurality of classes of fixed station and wherein the processing means has means for identifying the class to which a particular fixed station belongs and inserting a value in the algorithm in dependence upon the class of the fixed station for which a score is to be derived.

4. A system as claimed in claim 3, wherein at least some constants are selected in dependence on the class of fixed station.

5. A system as claimed in claim 2 wherein the fixed stations are categorised as macro, micro or pico stations.

6. A system as claimed in claim 1 wherein a transmission is rerouted during transmission if the score of an alternative fixed station exceeds that of the present fixed station by a predetermined value or ratio.

7. A terrestrial flight telephone system (TFTS) comprising at least one air station for location aboard an aircraft and a plurality of ground stations with which the at least one air station can communicate, the at least one air station comprising processing means for receiving selected criteria, deriving from a plurality of those criteria a score for each of a plurality of ground stations with which the at least one air station is able to communicate, and selecting on the basis of those scores the ground station via which a transmission is to be routed, said score for each particular ground station being derived from an algorithm into which the selected criteria are input, the processing means comprising means for receiving signals relating to the status of the air station and/or ground station for which it is determining a score, wherein said at least one criterion is multiplied by a constant associated with that criterion, the value of the constant being selected from one of a number of values depending on the status of the air and/or ground station.

8. A terrestrial flight telephone system (TFTS) comprising at least one air station for location aboard an aircraft and a plurality of ground stations with which the at least one air station can communicate, the at least one air station comprising processing means for receiving selected criteria, deriving from a plurality of those criteria a score for each of a plurality of ground stations with which the at least one air station is able to communicate, and selecting on the basis of those scores the ground station via which a transmission is to be routed, said score for each particular ground station being derived from an algorithm into which the selected criteria are input, wherein the system comprises a plurality of classes of ground station and wherein the processing means has means for identifying the class to which a particular ground station belongs and inserting a value in the algorithm in dependence upon the class of the ground station for which a score is to be derived.

9. A system as claimed in claim 7 comprising a plurality of classes of ground station and wherein the processing means has means for identifying the class to which a particular ground station belongs and inserting a value in the algorithm in dependence upon the class of the ground station for which a score is to be derived.

10. A system as claimed in claim 9, wherein at least some constants are selected in dependence on the class of ground station.

11. A system as claimed in claim 8 wherein the ground stations are categorised as macro, micro or pico stations.

12. A system as claimed in claim 7 wherein a transmission is rerouted during transmission if the score of an alternative ground station exceeds that of the present ground station by a predetermined value or ratio.

13. A terrestrial flight telephone system (TFTS) comprising at least one air station for location aboard an aircraft and a plurality of ground stations with which the at least one air station can communicate, the at least one air station comprising processing means for receiving selected criteria, deriving from a plurality of those criteria a score for each of a plurality of ground stations with which the at least one air station is able to communicate, and selecting on the basis of those scores the ground station via which a transmission is to be routed, wherein the ground stations include a number of airport ground stations, located at or close to airports, a number of intermediate ground stations and a number of en-route ground stations, and wherein an algorithm implemented by said processing means, and constants associated with that algorithm, are such that selection of a transmission route to or from an air station located on an aircraft: on the ground is biased in preference of an airport ground station; on a plane taking off or landing in preference of an intermediate station; and on a plane en-route in preference of an en-route station.

14. A terrestrial flight telephone system (TFTS) comprising at least one air station for location aboard an aircraft and a plurality of ground stations with which the at least one air station can communicate, the at least one air station comprising processing means for receiving selected criteria, deriving from a plurality of those criteria a score for each of a plurality of ground stations with which the at least one air station is able to communicate, and selecting on the basis of those scores the ground station via which a transmission is to be routed, wherein the processor receives at least four of the following criteria: closing rate to a ground station; quality of signal to or from a ground station; signal strength to or from a ground station; the cell limit of a ground station; the range to a ground station; whether the aircraft with which the processing means is associated is on the ground; and whether a ground station can be legally accessed.

15. A terrestrial flight telephone system (TFTS) comprising at least one air station for location aboard an aircraft and a plurality of ground stations with which the at least one air station can communicate, the at least one air station comprising processing means for receiving selected criteria, deriving from a plurality of those criteria a score for each of a plurality of ground stations with which the at least one air station is able to communicate, and selecting on the basis of those scores the ground station via which a transmission is to be routed, wherein said processing means implements the following algorithm:

$$[S]_{gs}=(k_{cr}{\times}C_{cr}+k_{r}{\times}C_{r}+k_{ss}{\times}C_{ss}+k_{mr}{\times}C_{mr})k_{q}{\times}C_{q}{\times}k_{sl}/k_{ho},$$

where $[S]_{gs}$ is the score for a particular ground station, $C_{cr}$ is a function of the closing rate between said at least one air station and the particular ground station, $C_r$ is a function of the range of said at least one air station from the particular ground station, $C_{ss}$ is a function of the signal strength of a signal received by said at least one air station from the particular ground station, $C_{mr}$ is a function of the maximum range of a cell served by the particular ground station, $C_q$ is a function of a quality factor for the signal received by said at least one air station from the particular ground station, $k_{cr}$, $k_r$, $k_{ss}$, $k_{mr}$, and $k_q$ are weighting constants for $C_{cr}$, $C_r$, $C_{ss}$, $C_{mr}$, and $C_q$, respectively, $k_{sl}$ is a constant pertaining to whether the particular ground station can legally be accessed by the at least one air station, and $k_{ho}$ is a constant pertaining to the position of said at least one air station with respect to a handover region around the particular ground station.

16. A method of selecting a cellular telecommunications system via which of a plurality of fixed stations a transmission with a mobile station is to be routed, the method comprising, for each of a plurality of fixed stations with which the mobile can communicate, receiving selected criteria and inputting these into an algorithm to derive a score for each fixed station, and deciding on the basis of the scores through which fixed station the transmission is to be routed, the method further comprising determining the status of the fixed station and/or mobile station, and multiplying the value of at least one criterion by a constant the value of which depends the status of the fixed station or mobile station.

17. A method of selecting in a cellular telecommunications system via which of a plurality of fixed stations a transmission with a mobile station is to be routed, the method comprising, for each of a plurality of fixed stations with which the mobile station can communicate, receiving selected criteria and inputting these into an algorithm to derive a score for each fixed station, and deciding on the basis of the scores through which fixed station the transmission is to the routed, the method further comprising deploying fixed stations of different classes, identifying the class to which a fixed station belongs and inserting a value in the algorithm in dependence on the class of the fixed station for which a score is to be derived.

18. A method as claimed in claim 16 comprising deploying fixed stations of different classes, identifying the class to which a fixed station belongs and inserting a value in the algorithm in dependence on the class of the fixed station for which a score is to be derived.

19. A method as claimed in claim 18 comprising selecting a value of at least some constants in dependence on the class of a fixed station for which a score is to be derived.

20. A method as claimed in claim 16 comprising rerouting a transmission if the score of an alternative fixed station exceeds that of the present fixed station by a predetermined value or ratio.

21. A method of selecting in a Terrestrial Flight Telephone System via which of a plurality of fixed ground stations a transmission to a mobile air station located aboard an aircraft is to be routed, the method comprising for each of a plurality of ground stations with which the mobile station can communicate, receiving selected criteria, inputting these into an algorithm to derive a score for each ground station, and deciding on the basis of the scores through which ground station the transmission is to be routed, the method further comprising determining the status of the ground station and/or respective air station, and multiplying the value of at least one criterion by a constant the value of which depends on the ground station or air station.

22. A method of selecting in a Terrestrial Flight Telephone System via which of a plurality of fixed ground stations a transmission to a mobile air station located aboard an aircraft is to be routed, the method comprising for each of a plurality of ground stations with which the mobile station can communicate, receiving selected criteria, inputting these into an algorithm to derive a score for each ground station, and deciding on the basis of the scores through which ground station the transmission is to be routed, the method further comprising deploying ground stations of different classes, identifying the class to which a ground station belongs and inserting a value in the algorithm in dependence on the class of the ground station for which a score is to be derived.

23. A method as claimed in claim 21 comprising deploying ground stations of different classes, identifying the class to which a ground station belongs and inserting a value in the algorithm in dependence on the class of the ground station for which a score is to be derived.

24. A method as claimed in claim 23 comprising selecting a value of at least some constants in dependence on the class of a ground station for which a score is to be derived.

25. A method as claimed in claim 21 comprising rerouting a transmission if the score of an alternative ground station exceeds that of the present ground station by a predetermined value or ratio.

26. A method of selecting in a Terrestrial Flight Telephone System via which of a plurality of fixed ground stations a transmission to a mobile air station located aboard an aircraft is to be routed, the method comprising for each ground station with which the mobile station can communicate, receiving selected criteria, inputting these into an algorithm to derive a score for each ground station, and deciding on the basis of the scores through which ground-station the transmission is to be routed, wherein the ground stations are categorized into three classes: airport, intermediate and en-route, and wherein the algorithm and constants associated with that algorithm are selected such that if the air station is located in an aircraft on the ground the algorithm is biased in favour of selection of an airport ground station, if the aircraft is taking off or landing, biased in favour of selection of an intermediate ground station, and if en-route, biased in favour of selection of an intermediate ground station, and if en-route, biased in favour of en-route ground station.

27. A method of selecting in a Terrestrial Flight Telephone System via which of a plurality of fixed ground stations a transmission to a mobile air station located aboard an aircraft is to be routed, the method comprising for each ground station with which the mobile station can communicate, receiving selected criteria and deriving from a plurality of these score for each ground station, and deciding on the basis of the scores through which ground station the transmission is to be routed, wherein the selected criteria include at least four of the following criteria: closing rate to a ground station; quality of signal to or from a ground station; signal strength to or from a ground station; the cell limit of a ground station; the range to a ground station; whether the aircraft with which the processing means is associated is on the ground; and whether a ground station can be legally accessed.

28. A system as claimed in claim 2, wherein a transmission is rerouted during transmission if the score of an alternative fixed station exceeds that of the present fixed station by a predetermined value or ratio.

29. A system as claimed in claim 8, wherein a transmission is rerouted during transmission if the score of an alternative ground station exceeds that of the present ground station by a predetermined value or ratio.

30. A system as claimed in claim 9 comprising a number of ground stations categorized as airport ground stations, located at or close to airports, a number of intermediate ground stations and a number of en-route ground stations, wherein a algorithm implemented by said processing means, and constants associated with that algorithm, are such that selection of a transmission route to or from an air station located on an aircraft: on the ground is biased in preference of an airport ground station; on a plane taking off or landing in preference of an intermediate station; and on a plane en-route in preference of an en-route station.

31. A system as claimed in claim 9 wherein the processor receives at least four of the following criteria: closing rate to a ground station; quality of signal to or from a ground station; signal strength to or from a ground station; the cell limit of a ground station; the range to a ground station; whether the aircraft with which the processing means is associated is on the ground; and whether a ground station can be legally accessed.

32. A system as claimed in claim 9 employing the algorithm $$[S]_{gs}=(k_{cr}\times C_{cr}+k_r\times C_r+k_{ss}\times C_{ss}+k_{mr}\times C_{mr})k_q\times C_q\times k_{sl}/k_{ho},$$

where $[S]_{gs}$ is the score for a particular ground station, $C_{cr}$ is a function of the closing rate between said at least one air station and the particular ground station, $C_r$ is a function of the range of said at least one air station from the particular ground station, $C_{ss}$ is a function of the signal strength of a signal received by said at least one air station from the particular ground station, $C_{mr}$ is a function of the maximum range of a cell served by the particular ground station, $C_q$ is a function of a quality factor for the signal received by said at least one air station from the particular ground station, $k_{cr}$, $k_r$, $k_{ss}$, $k_{mr}$, and $k_q$ are weighting constants for $C_{cr}$, $C_r$, $C_{ss}$, $C_{mr}$, and $C_q$, respectively, $k_{sl}$ is a constant pertaining to whether the particular ground station can legally be accessed by the at least one air station, and $k_{ho}$ is a constant pertaining to the position of said at least one air station with respect to a handover region around the particular ground station.

33. A method as claimed in claim 17, comprising rerouting a transmission if the score of an alternative fixed station exceeds that of the present fixed station by a predetermined ratio or value.

34. A method as claimed in claim 22, comprising rerouting a transmission if the score of an alternative station exceeds that of the present ground station by a predetermined ratio or value.

35. A method as claimed in claim 22 comprising categorizing the ground stations into three classes: airport, intermediate and en-route, and selecting through which ground station a transmission is to be routed by applying an algorithm, the algorithm and constants associated with that algorithm being selected such that if the air station is located in an aircraft on the ground the algorithm is biased in favour of selection of an airport ground station, if the aircraft is taking off or landing, biased in favour of selection of an intermediate ground station, and if en-route, biased in favour of an en-route ground station.

36. A method as claimed in claim 22 comprising making a selection of ground station in dependence on at least four of the following criteria: closing rate to a ground station; quality of signal to or from a ground station; signal strength to or from a ground station; the cell limit of a ground station; the range to a ground station; whether the aircraft with which the processing means is associated is on the ground; and whether a ground station can be legally accessed.

\* \* \* \* \*